United States Patent [19]
Baker et al.

[11] Patent Number: 4,901,288
[45] Date of Patent: Feb. 13, 1990

[54] COMPACT CYLINDRICAL SONOBUOY

[75] Inventors: Carl F. Baker, Kalamazoo; Theadore E. Upham, Jackson, both of Mich.

[73] Assignee: Sparton Corporation, Jackson, Mich.

[21] Appl. No.: 210,367

[22] Filed: Jun. 23, 1988

[51] Int. Cl.⁴ ............ H04B 1/59
[52] U.S. Cl. ............ 367/4
[58] Field of Search ............ 367/3-6; 441/1, 7, 11, 17, 24, 26, 28; 114/326, 328

[56] References Cited

U.S. PATENT DOCUMENTS 3,248,688 4/1963 Shomphe ............ 367/4
4,103,379 8/1978 Wolfe ............ 441/11
4,357,688 11/1982 Dale et al. ............ 367/4

*Primary Examiner*—Thomas H. Tarcza
*Assistant Examiner*—Daniel T. Pihulic
*Attorney, Agent, or Firm*—Reising, Ethington, Barnard, Perry & Milton

[57] ABSTRACT

A small sonobuoy for dropping without a parachute and quickly deploying hydrophones is cylindrical and adapted to float with its axis parallel to the water. The hydrophone cable is wrapped around the housing so that the housing rotates as the cable is payed out. The antenna is also wrapped around the housing and is released after the cable is fully deployed. A retainer covering the coiled cable and the stored hydrophones is held in place by a releasable pin which is released by an electrical device activated by a sea water sensitive switch. The device heats a resistor which melts a lanyard which releases the pin.

8 Claims, 3 Drawing Sheets

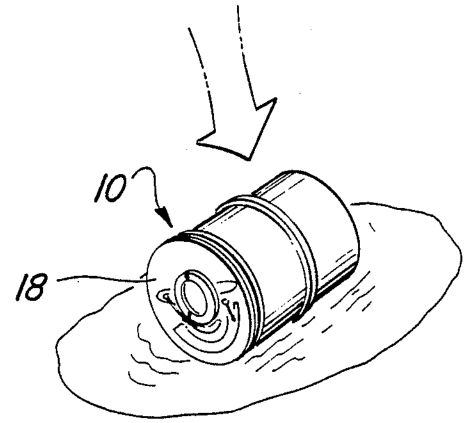
IFig-1
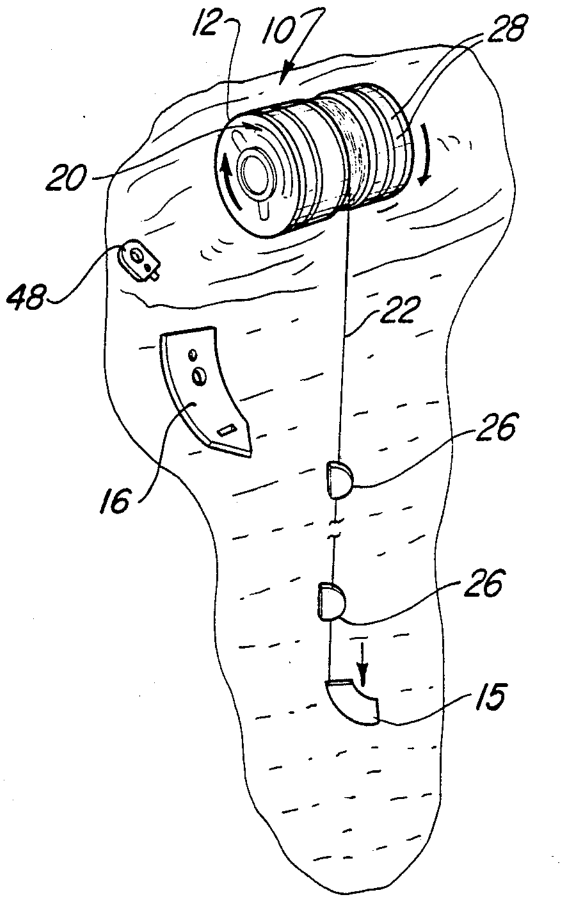
IFig-2
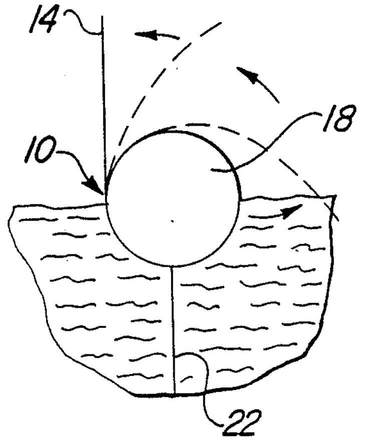
IFig-3
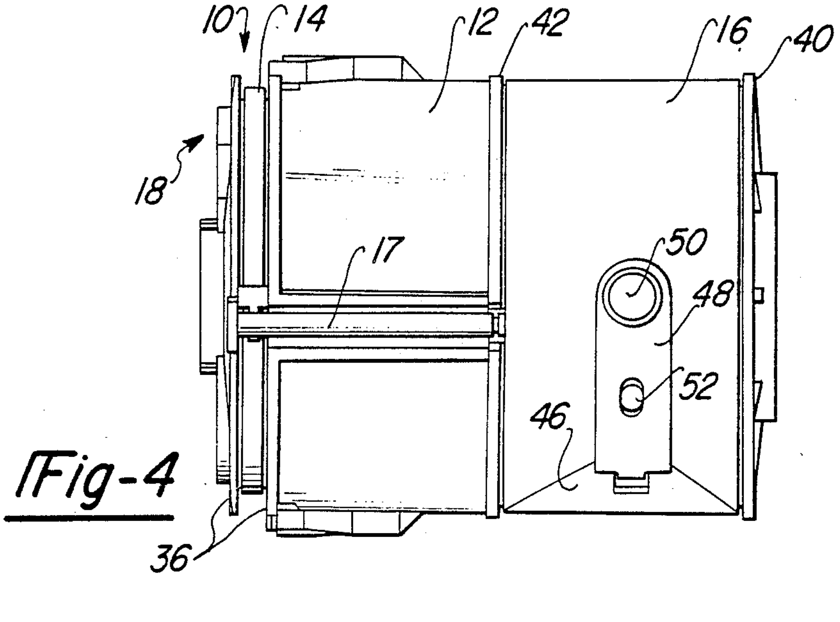
IFig-4

COMPACT CYLINDRICAL SONOBUOY

FIELD OF THE INVENTION

This invention relates to a sonobuoy and particularly to an inexpensive sonobuoy intended for quick deployment.

BACKGROUND oF THE INVENTION

It is well known to utilize sonobuoys for the detection of underwater sounds from ships or other sound sources. In some cases very long life or very deep submergence is required and the sonobuoy is especially designed for such purpose, often resulting in very expensive devices. In other cases relatively short life and moderate depths are required so economies of design can be employed. This becomes important where large numbers of sonobuoys are needed. Even in that case the feature of fast deployment is a priority so that information can be gathered with a minimum of delay. To that end, it is desirable to drop sonobuoys from an airplane without the use of parachutes which delay the deployment and sometimes hinder the dropping location accuracy as well. Thus ruggedness to withstand impact with the water is a vital concern.

The U.S. Patent to Dale et al. 4,357,688 discloses a spherical sonobuoy having a spring wire antenna wrapped around its circumference. The antenna is held by a heat responsive clip which is released upon closure of a water activated switch. A hydrophone and cable assembly are released by the uncoiling of the antenna. A conventional cable pay out system is employed. To absorb impact the body of the sphere is made of foam with the secondary result that the sonobuoy will remain afloat for a very long time. Heavy components are stored in the bottom half of the buoy to assure upright flotation. Another spherical sonobuoy is disclosed by the Shomphe U.S. Pat. No. 3,248,688 which teaches that the battery can be suspended below the buoy to stabilize the flotation.

The spherical sonobuoys have the drawback that they inherently make inefficient use of space. Launching facilities generally require that the sonobuoys fit within a launching tube of a fixed diameter, say five inches, and the inexpensive buoys can be packed several per tube. Spheres do not pack tightly together since much space exists between them even when they touch at their diameters. The tube diameter strictly limits the volume of any sphere that fits within the tube. By making the sonobuoys cylindrical they can fit snugly end to end within the launching tube and the cylinder length can be chosen to accommodate the precise needs of the equipment.

SUMMARY OF THE INVENTION

It is therefore an object of the invention to provide a rugged, low cost, cylindrical sonobuoy.

The invention is carried out by a sonobuoy comprising, a generally cylindrical housing defining an axis and including a cylindrical portion, an electronic circuit in said housing, hydrophone means releasably retained in said housing, an electrical signal cable coiled around said cylindrical portion of the housing and electrically connected between said hydrophone means and said electronic circuit, said housing being buoyant in water and adapted to float with the axis of the housing parallel to the surface of the water, and means for releasing said hydrophone means from said housing while the sonobuoy is in a body of water whereby said hydrophone means sinks and said cable is uncoiled thereby causing rotation of the housing about said axis as the hydrophone means descends.

The invention further contemplates a self-erecting antenna wrapped around the housing and held in storage position by a latch which is released by paying out the cable.

BRIEF DESCRIPTION OF THE DRAWINGS

The above and other advantages of the invention will become more apparent from the following description taken in conjunction with the accompanying drawings wherein like references refer to like parts and wherein:

FIG. 1 is an isometric view of the sonobuoy according to the invention as it reaches the water after launch;

FIG. 2 is an isometric view of the sonObuoy according to the invention as it is in the process of paying out cable;

FIG. 3 is an end view of the sonobuoy according to the invention as it deploys an antenna;

FIG. 4 is a top view of the sonobuoy according to the invention in fully assembled condition;

DESCRIPTION OF THE PREFERRED EMBODIMENT

Figure 5:
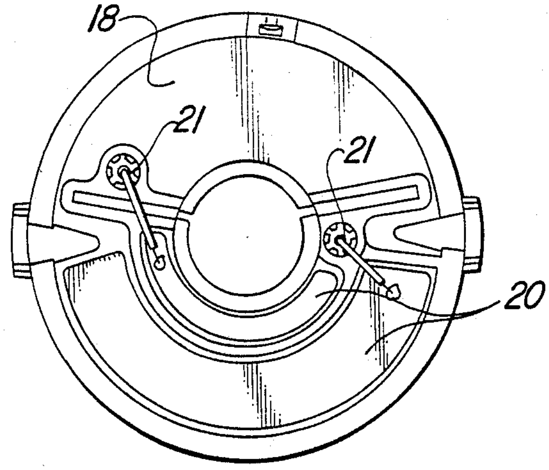
FIG. 5 is an end elevation of the sonobuoy of FIG. 4.
Figure 6:
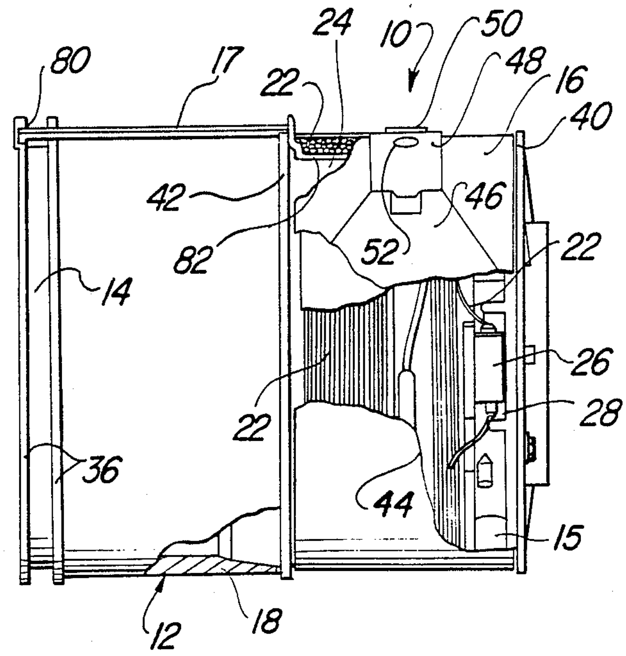
FIG. 6 is a partly broken away side elevation of the sonobuoy of FIG. 4.

As shown in the FIGS. 1 to 3 the sonobuoy 10 is generally cylindrical and disposed to float with its axis parallel to the water surface. In its fully assembled condition as shown in FIGS. 1 and 4, the sonobuoy 10 reveals a housing 12, an antenna 14 wrapped around one end of the housing 12, and a retainer 16 at the opposite end of the housing wrapped completely around the housing covering nearly half the housing length. Retainer 16 retains ballast weight 15 and hydrophones 26 before water impact. It also protects cable 22 from damage due to water impact. An antenna latch 17 extends from a pivotal attachment point adjacent to the antenna 14 in an axial direction to a point beneath the retainer 16. An end wall 18 of the housing 12 supports a pair of spaced arcuate foil contacts 20 as best shown in FIG. 5. Conductors are connected to the contacts 20 and to the internal circuit via through connectors 21. As shown in FIGS. 2 and 6, when the retainer 16 is released and falls free it can be seen that the conductive hydrophone cable 22 is wrapped around a cylindrical portion 24 of the housing 12 and is attached to the ballast 15 as well as to a hydrophone 26 or, if desired, an array of hydrophones. Storage compartments 28 for the hydrophones are beneath the retainer 16 and adjacent the cylindrical portion 24.

The scheme for deployment of the sonobuoy as shown in stages in FIGS. 1, 2 and 3 is that as the device contacts the sea water the contacts 20 are bridged by the water to close a circuit which releases the retainer. The retainer 16 falls free, releasing ballast 15 which sinks pulling the hydrophones after it and pulling the cable tangentially off the cylindrical portion 24 of the housing 12. This causes the cylinder to rotate about its axis until the cable is fully payed out. The cable enters the housing at the "bottom" so that the pull of the cable 22 helps hold the housing in a preferred floating position wherein the antenna is upright. The antenna 14 is released to assume its erect position and immediately transmit signals when the cable is fully payed out as it unwinds from the housing.

Figure 7:
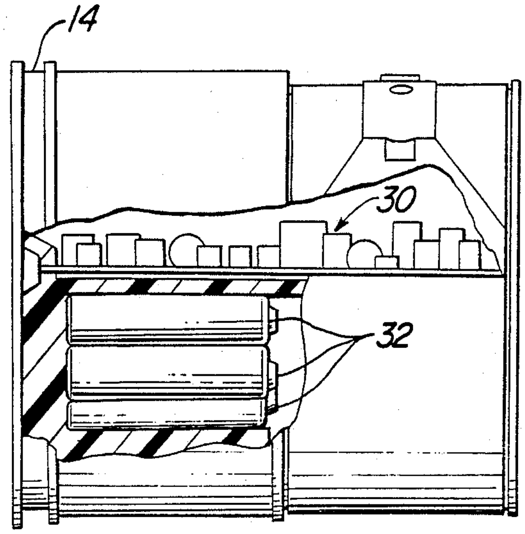
FIG. 7 is broken away elevation of the sonobuoy of FIG. 4 showing electronic circuit storage.

The housing 12 comprises two cup-shaped halves of molded plastic joined to form a hollow enclosure (FIGS. 6 and 7) and contains an electronic circuit 30, batteries 32, a release mechanism (FIGS. 8-10) and considerable air space for flotation. The enclosure is sealed against water entry. There are, however, two soluble plugs in the housing, not shown, which dissolves after a predetermined time in the water to allow water entry to scuttle the sonobuoy. The components are arranged in the housing so that after releasing the hydrophones 26 the center of mass is centered between the ends of the housing and below the cylinder axis of the housing 12 to provide flotation with the housing axis parallel to the water surface and to provide a righting moment to the housing. The righting moment is not so large as to prevent housing rotation during cable deployment. One end of the housing has a pair of spaced flanges 36 on either side of a cylindrical housing portion to form a recess for storage of the antenna 14. The antenna 14 itself comprises a normally straight flat metal spring covered with an insulation coating. The housing 12 has another flange 40 on the end opposite the antenna 14 and a center flange 42 about midway between the housing ends. Still another flange 44 of smaller diameter lies between the flanges 40 and 42 to separate the hydrophone storage area from the cylindrical portion which receives the coiled cable 22. The retainer 16 fits around the housing between the flanges 40 and 42.

The retainer 16 is a spring metal band which normally assumes an arcuate shape of diameter much larger than the housing 12 so that when released it readily detaches from the housing and sinks. When assembled to the housing it wraps around the housing under spring tension. The outer end 46 of the retainer tapers to a central point where it is attached to a spring loaded latch arm 48 which is, in turn, secured to the housing by a releasable pin 50. The latch arm is biased in a direction to pull the pin 50 out of the housing. A locating pin 52 attached to the housing extends through suitable apertures in the retainer and the latch arm to facilitate proper positioning of the retainer 16 during assembly.

Figure 8:
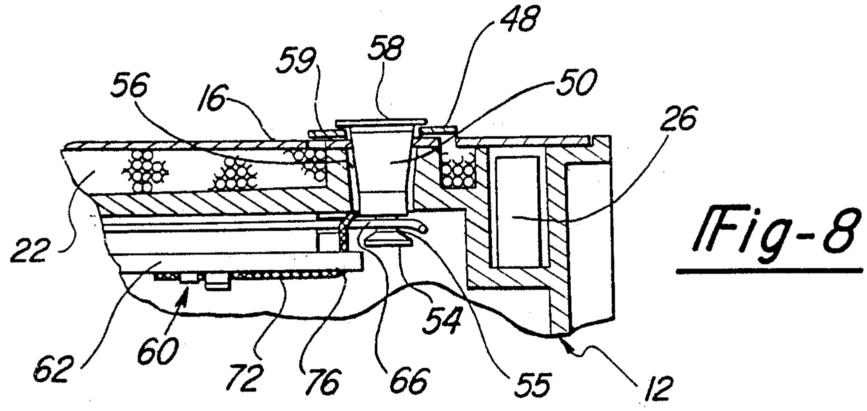
FIG. 8 is a cross sectional detail of a retainer release arrangement according to the invention.

As shown in FIG. 8, the pin 50 terminates in an inner conical knob 54 supported on a stem 55. The shank of the pin is tapered to fit in a conforming hole 56 through the housing 12 and has a head 58 engaging the outer surface of the latch arm 48. An aperture in the retainer 16 allows passage of the pin 50. A seal washer 59 trapped between the arm 48 and the housing 12 prevents leakage through the hole 56. An electrically actuated release mechanism 60 is secured inside the housing to engage the pin 50.

Figure 9:
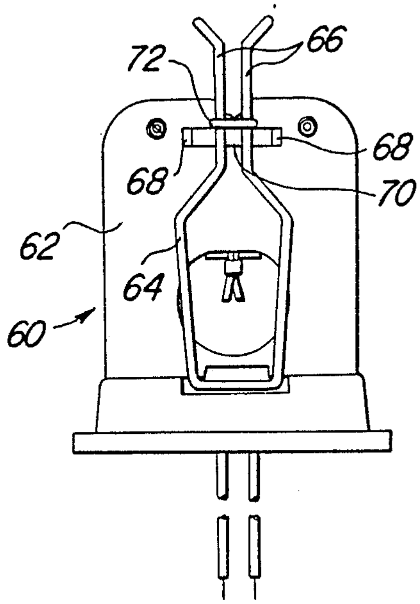
FIGS. 9 and 10 are front and rear elevations of a release mechanism for the retainer release of FIG. 8.
Figure 10:
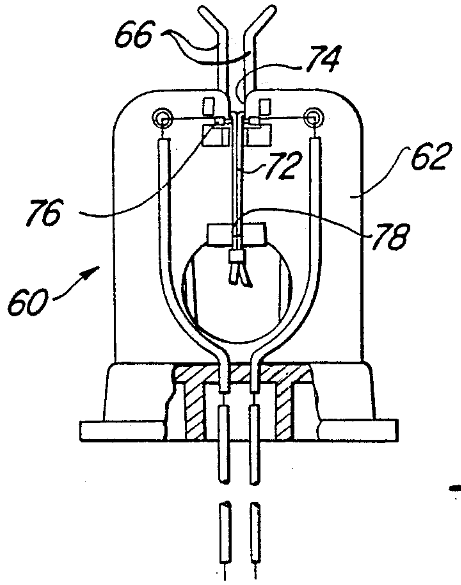

The release mechanism 60 is best shown in FIGS. 9 and 10 and has an elongated plastic support 62 and a generally U-shaped spring wire clip 64 secured at the U bend to the support 62. The wire ends 66 of the clip 64 are retained between stops 68 molded on the support and are separated by a spacer 70, also molded on the support 62. The extremities of the wire ends are slightly bent outwardly to facilitate assembly to the pin 50. A synthetic fiber lanyard 72 is wrapped around the wire ends 66 to pull them together against the spacer 70. The lanyard 72 is fed through a slot 74 in the support 62 behind the spacer 70, then bends around a heating resistor 76 to lie along the back side of the support 62 and is retained in a holding groove 78. The resistor 76 is secured adjacent the slot 74 to assure contact with the lanyard. The resistor leads are serially connected to the batteries and the switch contacts 20. When sea water wets the contacts 20 current flows through the heating resistor 76 which becomes hot enough to melt or otherwise disintegrate the lanyard 72 thereby releasing the wire ends 66 so that they will spread against the stops 68.

The pin 50 is locked in place (FIG. 8) by the release mechanism 60 upon assembly of the sonobuoy. The wire ends straddle the stem 55 to engage the knob 54 and hold the pin 50 against the releasing force of the latch arm 48. The pin is released and pulled out when the lanyard 72 is parted and the wire ends 66 spread apart to clear the knob 54. Then the retainer 16 springs open and detaches from the housing.

The antenna latch 17 (FIGS. 4 and 6) is a lever having one end loosely received in a socket 80 formed in the outer flange 36 so that the latch can pivot in the socket. The end of the antenna 14 is biased against the latch adjacent its pivot point so that the antenna cannot unwrap so long as the latch is in place. The other end on the antenna latch 17 extends across the center flange 42 and engages an offset tab 82 which conforms to the contour of the flange 42 and the cylindrical portion 24. The cable 22 is wound over the offset tab 82 so that the latch 17 is firmly held in place. The cable is so arranged over the offset tab 82 that the latch 17 is released only when the cable is fully payed out. When the latch is released the spring force of the antenna 14 pivots the latch open and the antenna unwinds as shown in FIG. 3.

It will thus be seen that the sonobuoy according to the present invention affords a rugged compact package which is inexpensive to manufacture in large volume production and which quickly deploys hydrophones when dropped onto the ocean surface.

What is claimed is:

1. A sonobuoy comprising:

a generally cylindrical housing defining an axis and including a cylindrical portion, an electronic circuit in said housing, an antenna supported on said housing in a retracted position, hydrophone means releasably retained in said housing, an electrical signal cable coiled around said cylindrical portion of the housing and electrically connected between said hydrophone means and said electronic circuit, said housing being buoyant in water and adapted to float with the axis of the housing parallel to the surface of the water, means for moving said antenna to an erected position, and means for releasing said hydrophone means from said housing while the sonobuoy is in a body of water whereby said hydrophone means sinks and said cable is uncoiled thereby causing rotation of the housing about said axis as the hydrophone means descends, the center of mass of said sonobuoy, after deployment of said hydrophone means, being located with respect to the center of rotation of the housing to provide a righting moment which, in conjunction with the pull of the cable, causes said sonobuoy to float with said antenna extending vertically after it is erected, the righting moment being small enough to allow rotation of the housing during descent of the hydrophone means.

2. The invention as defined in claim 1 including;

a ballast releasably retained in said housing and attached to the cable, a detachable retainer on said housing for releasably retaining said hydrophone means and said ballast, whereby when said detachable retainer is released the hydrophone means and ballast sink and pull the cable from said housing.

3. The invention as defined in claim 1 including;

a power supply in said housing, a recess in said housing, said hydrophone means being disposed in said recess, a ballast releasably retained in said recess and attached to said cable, a detachable retainer for releasably retaining said hydrophone means and said ballast in said recess, whereby the hydrophone means and ballast sink and pull the cable from said housing upon release of the retainer, a latch means including a releasable fastener for securing said retainer to said housing, said fastener including an electrically responsive release in circuit with the power supply, and sea water circuit closing means on the housing in circuit with the release for releasing said retainer upon wetting the housing with sea water.

4. The invention as defined in claim 3 wherein;

the retainer has a latch arm spring biased outwardly, and a pin coupled to the latch arm and in locking engagement with the fastener, the pin being biased toward release position by the latch arm and being held against release by the fastener.

5. The invention as defined in claim 4 wherein;

the fastener comprises a pair of spaced formed wire members spring biased apart, a heat fusible element for holding the wire members in closely spaced pin locking position, and the electrically responsive release for heating and effecting fusing of the fusible element upon circuit closing.

6. The invention as defined in claim 1 including;

an antenna wrapped around a second cylindrical portion of said housing, said antenna being electrically connected with said electronic circuit at one end and being made of spring material whereby it is self-erecting when the other end is released, and antenna retaining means for holding said antenna in its wrapped condition until said signal cable is uncoiled.

7. The invention as defined in claim 6 wherein the antenna retaining means is an elongated lever pivoted at one end and holding the said other end of the antenna near the pivot having a distal end held against the first cylindrical portion of the housing by windings of the cable so that the lever is free to pivot to an antenna release position when the cable is payed out.

8. A sonobuoy comprising, a generally cylindrical housing defining an axis and including first and second spaced cylindrical portions, an electronic circuit in said housing, hydrophone means releasably retained by said housing, an electrical signal cable coiled around said first cylindrical portion of the housing and electrically connected between said hydrophone means and said electronic circuit, said housing being buoyant in water and adapted to float with the axis of the housing parallel to the surface of the water, means for releasing said hydrophone means from said housing while the sonobuoy is in a body of water whereby said hydrophone means sinks and said cable is uncoiled thereby causing rotation of the housing about said axis as the hydrophone means descends, an antenna coiled around the second cylindrical portion, said antenna being connected to the electronic circuit and being made of spring material whereby it is self-erecting when released, a lever pivoted about a point near the second cylinder for holding the antenna in its coiled state when the lever is in latched position, the distal end of the lever extending to the first cylindrical portion and being bound to the housing by the coiled cable whereby the lever and the antenna are released when the cable is fully payed out.

* * * * *